June 3, 1947.  H. E. SCHENAVAR  2,421,466
FISHING FLOAT
Filed Sept. 7, 1945
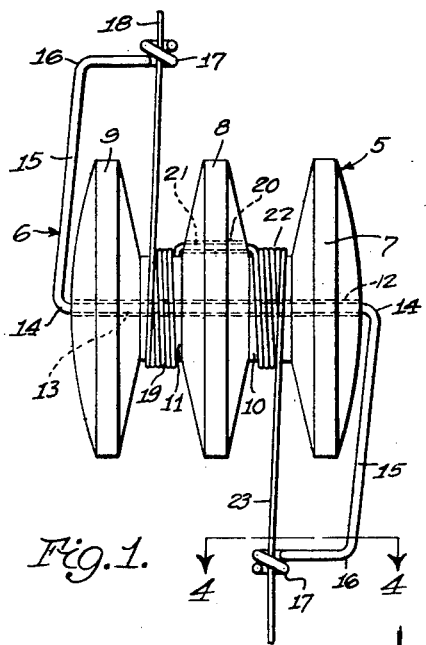
Fig.1.
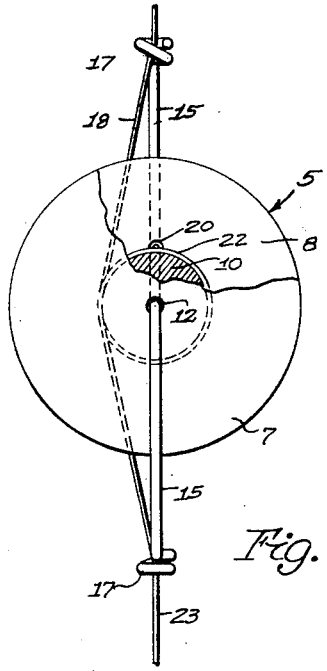
Fig.2.
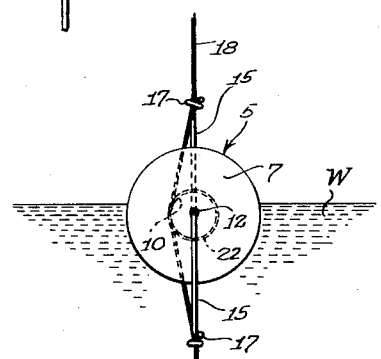
Fig.3.
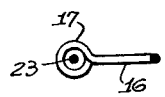
Fig.4.
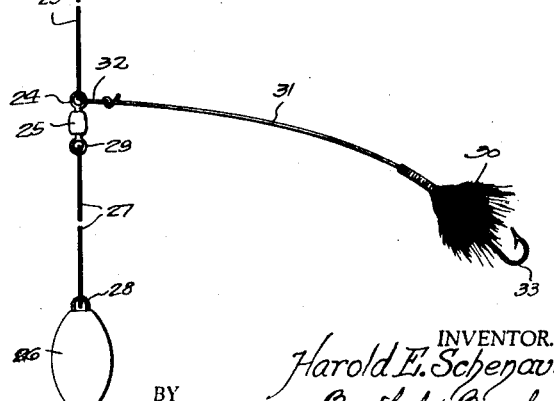
INVENTOR.
Harold E. Schenavar
BY Barthel + Bugbee
ATTORNEYS Patented June 3, 1947

2,421,466

UNITED STATES PATENT OFFICE 2,421,466

FISHING FLOAT

Harold E. Schenavar, Detroit, Mich.

Application September 7, 1945, Serial No. 614,861

1 Claim. (Cl. 43—51)

The present invention relates to improvements in fishing bobs or floats and has reference more particularly, to a bob or float which automatically seeks its own floating position with respect to the sinker on the fishing line.

The primary object of the invention is to provide a fishing float or bob which is so constructed as to automatically assume a correct position along the fishing line so that the distance from the float to the sinker on the end of the line will be automatically regulated depending upon the length of line wound upon the float or the depth of the body of water into which the sinker, fishing line and float have been cast.

Another object of the invention is to provide a fishing float or bob which is adapted to assume a position adjacent the fishing line sinker, when the fishing line, sinker and float are removed from the body of water to thereby facilitate casting and to enable the fisherman to cast without the liability of the sinker and float becoming entangled.

Another object of the invention is to provide a fishing bob or float shaped to provide a pair of spool portions for allowing the playing-in and out of the fish line when the fishing bob or float is cast and removed from a body of water in which the fisherman is fishing.

Another object of the invention is to provide a fishing bob or float which, when cast by the fisherman will assume a position adjacent the sinker of the fishing tackle and will be submerged after striking the water, until the buoyant force of the water has caused the float or bob to seek a floating position along the fishing line equal to a distance corresponding to the depth of the body of water into which the fishing tackle has been cast.

Other objects and advantages of the invention will become apparent during the course of the following description of the accompanying drawing, wherein:

Figure 1 is a plan view of a fishing bob or float embodying the invention illustrating the general shape thereof and the manner in which the same is applied to a fishing line;

Figure 2 is a side elevational view of the fishing bob or float showing the manner in which the fishing line is adapted to be reversely coiled on the spool-shaped fishing float or bob so that when said float is cast, the fishing bob will assume a position adjacent the sinker and upon being submerged in the water will seek its correct floating position with respect to the sinker corresponding to the depth of the body of water into which the fishing tackle has been cast;

Figure 3 is a side elevational view of the fishing tackle showing the relationship of the float or bob when the tackle is cast into a body of water; and Figure 4 is a horizontal cross-sectional view taken on line 4—4 of Figure 1 looking in the direction of the arrows and showing one of the guide eyelets for the fishing line.

In the drawing, the reference character 5 will generally be employed to designate the float or bob and the reference character 6 represents a supporting frame therefor to secure the same in place upon the fishing line. The float or bob 5 is formed of wood or other material having a density such as to cause the same to float on a body of water in much the same fashion as the fishing floats now employed. The bob 5 is spool-shaped and includes a series of annular enlarged portions 7, 8 and 9 which are connected by solid cylindrical portions 10 and 11. The annular enlarged portions 7, 8 and 9 as well as the solid cylindrical portions 10 and 11 are formed with an axial bore 12 for receiving the wire frame member 6. The intermediate portion of the wire frame member 6 as at 13 extends through the axial opening 12 and is bent at each end as at 14 in opposite directions to provide oppositely extending arm portions 15. The free ends of the arm portions 15 are bent further to extend inwardly as at 16 and terminate in coiled eyelet portions 17 for receiving and guiding a fishing line in a manner which will be hereinafter more fully described.

As shown in Figure 3, a fishing line 18 is passed through one of the coiled eyelets 17 and is wound upon the solid cylindrical portion 11 between the annular enlarged portions 8 and 9 of the fishing float or bob as at 19. The line is then passed through an opening 20 in the annular enlarged portion 8 of the fishing float or bob as at 21 and is reversely coiled as at 22 on the solid cylindrical portion 10 between the enlarged annular portions 7 and 8 of the float. The line is then guided through the other coiled eyelet 17 as at 23 and the free end is attached to the eyelet 24 of a swivel 25. A fishing sinker 26 is also attached to the swivel 25 by means of a short length of fishing line 27 which is affixed to the eyelet 28 of the sinker and to the eyelet 29 of the swivel 25. The fish hook or lure 30 is provided with a leader line 31 formed of catgut or the like which is attached to the eyelet 24 of the swivel 25 by being tied thereto as at 32. The fish lure 30 is of the usual construction and is similar to conventional lures on the market at present and is provided with a fish hook 33.

Operation of the invention

Before the fisherman makes a cast he measures off from the opening 20 a length of line corresponding to the depth at which he wishes to fish and winds it in a coil 22 upon the cylindrical portion 10 of the float 5. When the fisherman casts the fishing tackle into a body of water W (Figure 3), the bob or float 5 will be in a position adjacent the sinker 26 and the measured-off length of line 23 will be wound upon the solid cylindrical portion 10 of the fishing float or bob. Similarly, the portion of the line 18 coiled about the solid cylindrical portion 11 of the fishing float or bob 5 may be uncoiled in such a manner that the float, sinker, and fish lure will assume a convenient position with respect to the line 18 to facilitate casting with ease. When the fishing tackle, including the float 5, sinker 26 and fish lure 30, strike the water W, they will be submerged by reason of the weight of the sinker 26 pulling downwardly on the float 5. As soon as the buoyant force of the water has had a chance to act upon the fishing float or bob 5, the same will be raised to the surface of the water W. Meanwhile, however, the weight of the sinker 26 in sinking causes the portion of the line 22 coiled on the solid cylindrical portion 10 to unwind to the predetermined depth at which he wishes to fish, thereby causing rotation of the fishing float or bob 5 so as to wind up the fishing line 18 onto the coil 19 on the solid cylindrical portion 11 of the float. The fisherman need only relax the line sufficiently to permit the coiling of the line 18 on the solid cylindrical portion 11 of the float until the float has lost its weight and floats with a portion extending above the water. If the depth of the water is less than the length of the coil of line 22 wound upon the cylindrical portion 10, the sinker 26 of course rests on the bottom.

As soon as the fish strikes the artificial bait 30, the float or bob 5 will be deflected and the fisherman may draw in the line in the usual manner with the aid of a fishing reel and pole. While retrieving the fish caught by the artificial lure 30 and winding the line 18 upon the reel of the fishing pole, the float 5 due to the force of gravity, will fall toward the sinker 26. In so doing, the coiled portion of the line 19 on the cylindrical portion 11 of the float will unwind or play out, and the lower end of the line 23 will be coiled about the solid cylindrical portion 10 of the fish float or bob. Thus, the float or bob will assume a position on the extreme lower end of the fishing line so that when the fisherman again casts after removal of the fish from the lure 30 and hook 33, the same will be in a position for conveniently casting and permitting free swinging of the fishing tackle without the danger of the leader line 31, sinker 26 and float 5 becoming entangled.

While the fisherman is fishing with the float 5 in the water or partially submerged under the surface, the fishing line 18 may be maintained in a slightly relaxed condition until deflection of the float 5 has indicated that the fish has taken the artificial lure 30 and hook 33.

It is to be understood that the form of the invention herewith shown and described is to be taken as a preferred embodiment thereof and that various changes may be made in the shape, size and arrangement of parts without departing from the spirit of the invention or the scope of the subjoined claim.

What I claim is:

In combination with a fishing line having a sinker in the free end thereof, a fishing float comprising a cylindrical body portion having a pair of annular recesses to provide side by side line receiving grooves, and a guide frame having line guiding portions for guiding the fishing line into said line receiving grooves whereby said float will assume a position adjacent said sinker during casting of the line and will seek a position along said line after striking the water at a predetermined depth from said float, said frame including a central shaft portion extending through the body portion of said float having oppositely directed arms terminating in guide rings in alignment with the line-receiving grooves.

HAROLD E. SCHENAVAR.

REFERENCES CITED

The following references are of record in the file of this patent:

UNITED STATES PATENTS

| Number | Name | Date |
| --- | --- | --- |
| 541,789 | Kunzelman | June 25, 1895 |
| 1,992,293 | Craig | Feb. 26, 1935 |
| 2,190,113 | Chreitzberg | Feb. 13, 1940 |

FOREIGN PATENTS

| Number | Country | Date |
| --- | --- | --- |
| 793,379 | France | Jan. 23, 1936 |